(12) United States Patent  
Yu et al.

(10) Patent No.: US 12,333,418 B2  
(45) Date of Patent: Jun. 17, 2025

(54) METHOD AND DEVICE WITH NEURAL NETWORK IMPLEMENTATION

(71) Applicants: Samsung Electronics Co., Ltd., Suwon-si (KR); UNIST(ULSAN NATIONAL INSTITUTE OF SCIENCE AND TECHNOLOGY), Ulsan (KR)

(72) Inventors: Hyeongseok Yu, Seoul (KR); Hyeonuk Sim, Iksan-si (KR); Jongeun Lee, Ulsan (KR)

(73) Assignees: Samsung Electronics Co., Ltd., Suwon-si (KR); UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 0 days.

(21) Appl. No.: 18/489,209

(22) Filed: Oct. 18, 2023

(65) Prior Publication Data

US 2024/0046082 A1   Feb. 8, 2024

Related U.S. Application Data

(63) Continuation of application No. 16/893,560, filed on Jun. 5, 2020, now Pat. No. 11,829,862.

(30) Foreign Application Priority Data

Dec. 9, 2019   (KR) .................. 10-2019-0162910

(51) Int. Cl.  
*G06F 15/76* (2006.01)  
*G06N 3/04* (2023.01)  
*G06N 3/063* (2023.01)

(52) U.S. Cl.  
CPC ............... *G06N 3/063* (2013.01); *G06N 3/04* (2013.01)

(58) Field of Classification Search  
CPC ................................ G06N 3/063; G06N 3/04  
See application file for complete search history.

(56) References Cited

U.S. PATENT DOCUMENTS 10,706,349 B2   7/2020   Mody et al.  
10,726,330 B2   7/2020   Ferdman et al.  
(Continued)

FOREIGN PATENT DOCUMENTS

CN   106528047 B   *   4/2019   ............ G06F 7/575  
GB   2570186 A       7/2019  
(Continued)

OTHER PUBLICATIONS

Chen, Tianshi, et al. "Diannao: A small-footprint high-throughput accelerator for ubiquitous machine-learning." *ACM SIGARCH Computer Architecture News* 42.1 (2014): 269-284.

(Continued)

*Primary Examiner* — Cheng Yuan Tseng  
(74) *Attorney, Agent, or Firm* — NSIP Law

(57) ABSTRACT

A neural network device including an on-chip buffer memory that stores an input feature map of a first layer of a neural network, a computational circuit that receives the input feature map of the first layer through a single port of the on-chip buffer memory and performs a neural network operation on the input feature map of the first layer to output an output feature map of the first layer corresponding to the input feature map of the first layer, and a controller that transmits the output feature map of the first layer to the on-chip buffer memory through the single port to store the output feature map of the first layer and the input feature map of the first layer together in the on-chip buffer memory.

18 Claims, 10 Drawing Sheets

(56) References Cited

U.S. PATENT DOCUMENTS

| | | | |
|---|---|---|---|
| 10,768,856 B1* | 9/2020 | Diamant | ............ G06F 12/08 |
| 2017/0344882 A1 | 11/2017 | Ambrose et al. | |
| 2018/0046894 A1 | 2/2018 | Yao | |
| 2018/0046906 A1 | 2/2018 | Dally et al. | |
| 2019/0026246 A1 | 1/2019 | Chen et al. | |
| 2020/0285887 A1 | 9/2020 | Lee et al. | |

FOREIGN PATENT DOCUMENTS

| | | |
|---|---|---|
| KR | 10-2019-0022237 A | 3/2019 |
| WO | WO 2018/071546 A1 | 4/2018 |
| WO | WO 2018/158293 A1 | 9/2018 |
| WO | WO 2019/079322 A1 | 4/2019 |
| WO | WO 2019/220975 A1 | 5/2019 |
| WO | WO 2019/121206 A1 | 6/2019 |

OTHER PUBLICATIONS

Chen, Yu-Hsin, et al. "Eyeriss: An energy-efficient reconfigurable accelerator for deep convolutional neural networks." *IEEE journal of solid-state circuits* 52.1 (2016): 127-138.

Korean Office Action issued on Jun. 19, 2024, in counterpart Korean Patent Application No. 10-2019-0162910 (8 pages in English, 8 pages in Korean).

* cited by examiner

FIG. 7

| Parameter | Definition |
|---|---|
| M | # features in output feature map (OFM) |
| R,C | # rows (R) and # columns (C) of OFM |
| Z | # features in input feature map (IFM) |
| K | 2D convolution's filter size in each dimension |
| S | stride of 2D convolution in each dimension |
| P | stride of 2D pooling in each dimension |
| Q | size of 2D pooling kernel in each dimension |

```
for (m = 0; m<M; m+=TM){                      // M-loop
  WeightBias DRAM read();
  for (rr = 0; rr < R; rr+=P){                // RR-loop
    for (cc = 0; cc < C; cc+=P){              // CC-loop
700─ if (IFM_offchip_mode) IFM_DRAM_read();
      for (r = rr; r < min(rr + P,R); r++){   // R-loop
        for (c = cc; c < min(cc + P,C); c++){ // C-loop
          Initialize OFM with bias();
```

```
          for (i = 0; i < K; i++){            // K-loop #1
            for (j = 0; j <K; j++){           // K-loop #2
              for (z = 0; z < Z; z+=TZ){      // Z-loop
                OFM[m : m + TM][r][c] +=
                  W[m : m + TM][z : z + TZ][i][j] ·
                  IFM[z : z + TZ][S · r + i][S · c + j];
          }}}
          Activation();
          Pooling();
```

```
        }}                                    // R-loop ends
710─ if (OFM_offchip_mode) OFM_DRAM_write();
      }}}                                     // M-loop ends
```

METHOD AND DEVICE WITH NEURAL NETWORK IMPLEMENTATION

CROSS-REFERENCE TO RELATED APPLICATION

This application is a Continuation Application of U.S. patent application Ser. No. 16/893,560 filed on Jun. 5, 2020, which claims the benefit under 35 USC 119(a) of Korean Patent Application No. 10-2019-0162910, filed on Dec. 9, 2019, in the Korean Intellectual Property Office, the entire disclosure of which is incorporated herein by reference for all purposes.

BACKGROUND

1. Field

The following description relates to a method and device with neural network implementation.

2. Description of Related Art

A neural network device is a computing system based on a computational architecture. Neural network technologies may analyze input data and extract valid information therefrom.

Neural network devices typically require large amounts of computation of complex input data. In order for a typical neural network device to process a large number of computations, an operation of reading or writing large amounts of data is typically necessarily performed for the computation from or to memory, and thus, a large amount of energy may be consumed due to frequent memory access. Low-power and high-performance systems, such as mobile or Internet of Things (IoT) devices, typically have limited resources, and thus typically require technologies that reduce energy consumption required to process a large amount of data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a neural network device includes an on-chip buffer memory, a computational circuit, and a controller. The on-chip buffer memory is configured to store an input feature map of a first layer of a neural network. The computational circuit is configured to receive the input feature map of the first layer through a single port of the on-chip buffer memory, and perform a neural network operation on the input feature map of the first layer to output an output feature map of the first layer corresponding to the input feature map of the first layer. The controller is configured to transmit, through the single port, the output feature map of the first layer to the on-chip buffer memory to store the output feature map of the first layer and the input feature map of the first layer together in the on-chip buffer memory. The output feature map of the first layer is reused as an input feature map for a neural network operation of a second layer subsequent to the first layer.

The computational circuit may be further configured to perform the neural network operation based on one or more operation loops. The controller may be further configured to perform a read operation of reading data constituting, at least, a portion of the input feature map of the first layer from the on-chip buffer memory through the single port at each cycle in which each of the one or more operation loops is executed. When a write operation for writing data constituting, at least, a portion of the output feature map of the first layer to the on-chip buffer memory through the single port is requested at a timing at which the read operation is to be performed, the write operation may be performed in preference to the read operation.

The controller may allocate, in different directions, a first memory address of the on-chip buffer memory for storing the input feature map of the first layer and a second memory address of the on-chip buffer memory for storing the output feature map of the first layer.

The controller may allocate the first memory address in a first direction from a start point of a memory address corresponding to a storage space of the on-chip buffer memory, and allocate the second memory address in a second direction, opposite to the first direction, from a last point of the memory address corresponding to the storage space of the on-chip buffer memory.

When the output feature map of the second layer, corresponding to the input feature map of the second layer, is output from the computational circuit as the output feature map of the first layer stored in the second memory address and reused as the input feature map of the second layer, the controller may allocate a third memory address of the on-chip buffer memory for storing the output feature map of the second layer in the first direction from the start point.

The neural network operation may include a convolution operation, an activation operation, and a pooling operation. The computational circuit may be further configured to output, as the output feature map of the first layer, a result of performing the pooling operation as well as the convolution operation and the activation operation on the input feature map of the first layer.

The neural network device may further include a weight buffer memory configured to store weight values of the first layer for the neural network operation on the input feature map of the first layer. The weight buffer memory may receive the weight values of the first layer from an external memory external to the neural network device through a single port of the weight buffer memory, and transmit the weight of the first layer to the computational circuit through a single port of the weight buffer memory.

The on-chip buffer memory, the computational circuit, and the controller may be mounted in a single chip.

The neural network device may further include an auxiliary buffer memory. When the output feature map of the second layer, corresponding to the input feature map of the second layer, is output from the computational circuit, the controller may determine whether a total size of the input feature map of the second layer and the output feature map of the second layer exceeds a size of the on-chip buffer memory. When the total size exceeds the size of the on-chip buffer memory, the controller may temporarily store the output feature map of the second layer in the auxiliary buffer memory instead of the on-chip buffer memory. The output feature map of the second layer temporarily stored in the auxiliary buffer memory may be transmitted to an external memory outside the neural network device based on a preset period.

When an output feature map of a third layer, corresponding to an input feature map of the third layer, is output from the computational circuit as the output feature map of the second layer and reused as an input feature map for a neural network operation of the third layer subsequent to the second layer, the controller may determine whether a size of the output feature map of the third layer exceeds the size of the on-chip buffer memory. When the size of the output feature map of the third layer exceeds the size of the on-chip buffer memory, the controller may temporarily store the output feature map of the third layer in the auxiliary buffer memory. When the size of the output feature map of the third layer is less than or equal to the size of the on-chip buffer memory, the controller may store the output feature map of the third layer in the on-chip buffer memory.

In another general aspect, an operating method of a neural network device includes storing an input feature map of a first layer of a neural network in an on-chip buffer memory, transmitting the input feature map of the first layer to a computational circuit through a single port of the on-chip buffer memory, outputting an output feature map of the first layer, corresponding to the input feature map of the first layer, upon the computational circuit performing a neural network operation on the input feature map of the first layer, and transmitting the output feature map of the first layer to the on-chip buffer memory through the single port, thereby storing the output feature map of the first layer and the input feature map of the first layer together in the on-chip buffer memory. The output feature map of the first layer is reused as an input feature map for a neural network operation of a second layer subsequent to the first layer.

The method may further include performing a read operation through the single port of reading data constituting, at least, a portion of the input feature map of the first layer from the on-chip buffer memory at each cycle in which each of one or more operation loops is executed, in order to perform the neural network operation based on the one or more operation loops. When a write operation for writing data constituting, at least, a portion of the output feature map of the first layer to the on-chip buffer memory through the single port is requested at a timing at which the read operation is to be performed, performing the write operation in preference to the read operation.

The storing of the output feature map of the first layer and the input feature map of the first layer together in the on-chip buffer memory may include allocating, in different directions, a first memory address of the on-chip buffer memory for storing the input feature map of the first layer and a second memory address of the on-chip buffer memory for storing the output feature map of the first layer.

The allocating may include allocating the first memory address for storing the input feature map of the first layer, in a first direction from a start point of a memory address corresponding to a storage space of the on-chip buffer memory, and allocating the second memory address for storing the output feature map of the first layer, in a second direction opposite to the first direction from a last point of the memory address corresponding to the storage space of the on-chip buffer memory.

When the output feature map of the second layer, corresponding to the input feature map of the second layer, is output from the computational circuit as the output feature map of the first layer stored in the second memory address and reused as the input feature map of the second layer, may be allocating a third memory address of the on-chip buffer memory for storing the output feature map of the second layer in the first direction from the start point.

The neural network operation may include a convolution operation, an activation operation, and a pooling operation. The outputting may include outputting, as the output feature map of the first layer, a result of performing the pooling operation as well as the convolution operation and the activation operation on the input feature map of the first layer.

When weight values of the first layer are transmitted from an external memory external to the neural network device to a weight buffer memory through a single port of the weight buffer memory, may be storing in the weight buffer memory the weight values of the first layer used for the neural network operation, and transmitting the weight values of the first layer from the weight buffer memory to the computational circuit through the single port of the weight buffer memory.

When the output feature map of the second layer, corresponding to the input feature map of the second layer, is output from the computational circuit, may be determining whether a total size of the input feature map of the second layer and the output feature map of the second layer exceeds a size of the on-chip buffer memory. When it is determined that the total size exceeds the size of the on-chip buffer memory, may be temporarily storing the output feature map of the second layer in the auxiliary buffer memory instead of the on-chip buffer memory. The output feature map of the second layer temporarily stored in the auxiliary buffer memory may be transmitted to an external memory outside the neural network device based on a preset period.

When an output feature map of a third layer, corresponding to an input feature map of the third layer, is output from the computational circuit as the output feature map of the second layer and reused as an input feature map for a neural network operation of the third layer subsequent to the second layer, may be determining whether a size of the output feature map of the third layer exceeds the size of the on-chip buffer memory. When the size of the output feature map of the third layer exceeds the size of the on-chip buffer memory, may be temporarily storing the output feature map of the third layer in the auxiliary buffer memory, and when the size of the output feature map of the third layer is less than or equal to the size of the on-chip buffer memory, may be storing the output feature map of the third layer in the on-chip buffer memory.

A non-transitory computer readable recording medium storing instructions that, when executed by a processor, may cause the processor to control performance of the method above.

Other features and aspects will be apparent from the following detailed description, the drawings, and the claims.

BRIEF DESCRIPTION OF THE DRAWINGS

FIG. 7 is an algorithm illustrating an example operation loop executed to perform a neural network operation.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 1:
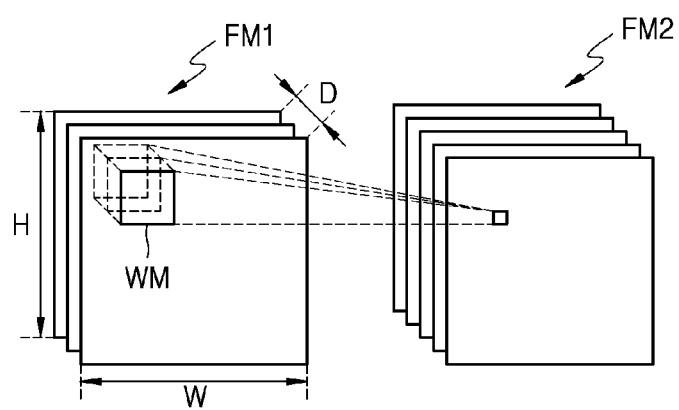
FIG. 1 is a diagram illustrating an example relationship between an input feature map and an output feature map in a neural network.

FIG. 1 is a diagram illustrating an example relationship between an input feature map and an output feature map in a neural network.

The neural network may be a deep neural network (DNN) or an n-layer neural network. A DNN or an n-layer neural network may be, for example, a convolutional neural network (CNN), a recurrent neural network (RN N), a deep belief network, or a restricted Boltzman machine.

In FIG. 1, in a layer of the neural network, a first feature map FM1 may correspond to an input feature map, and a second feature map FM2 may correspond to an output feature map. A feature map may refer to a set of data expressing various features of input data. The feature maps FM1 and FM2 may have elements of a two-dimensional matrix or elements of a three-dimensional matrix, and a pixel value may be defined in each element. Each of the feature maps FM1 and FM3 has a width W (or referred to as a column), a height H (or referred to as a row), and a depth D. The depth D may correspond to a number of nodes. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

A convolution operation may be performed on the first feature map FM1 and a weight map WM, and as a result, the second feature map FM2 may be generated. The weight map WM filters the features of the first feature map FM1 by performing a convolution operation with the first feature map FM1 by using a weight parameter defined in each element of the weight map WM filters. The weight map WM is used to perform a convolution operation with windows (or referred to as tiles) of the first feature map FM1 while shifting the first feature map FM1 in a sliding window manner. During each shift, each of the weight parameters included in the weight map WM may be multiplied with and added to each of the pixel values of an overlapped window in the first feature map FM1. As the first feature map FM1 and the weight map WM are convolved, one node of the second feature map FM2 may be generated. Although only one weight map WM is illustrated in FIG. 1, a plurality of weight maps may be respectively convolved with the first feature map FM1 to generate a second feature map FM2 having a plurality of nodes.

The second feature map FM2 may correspond to an input feature map of the next layer. For example, the second feature map FM2 may be an input feature map of a pooling (or sub-sampling) layer.

Figure 2:
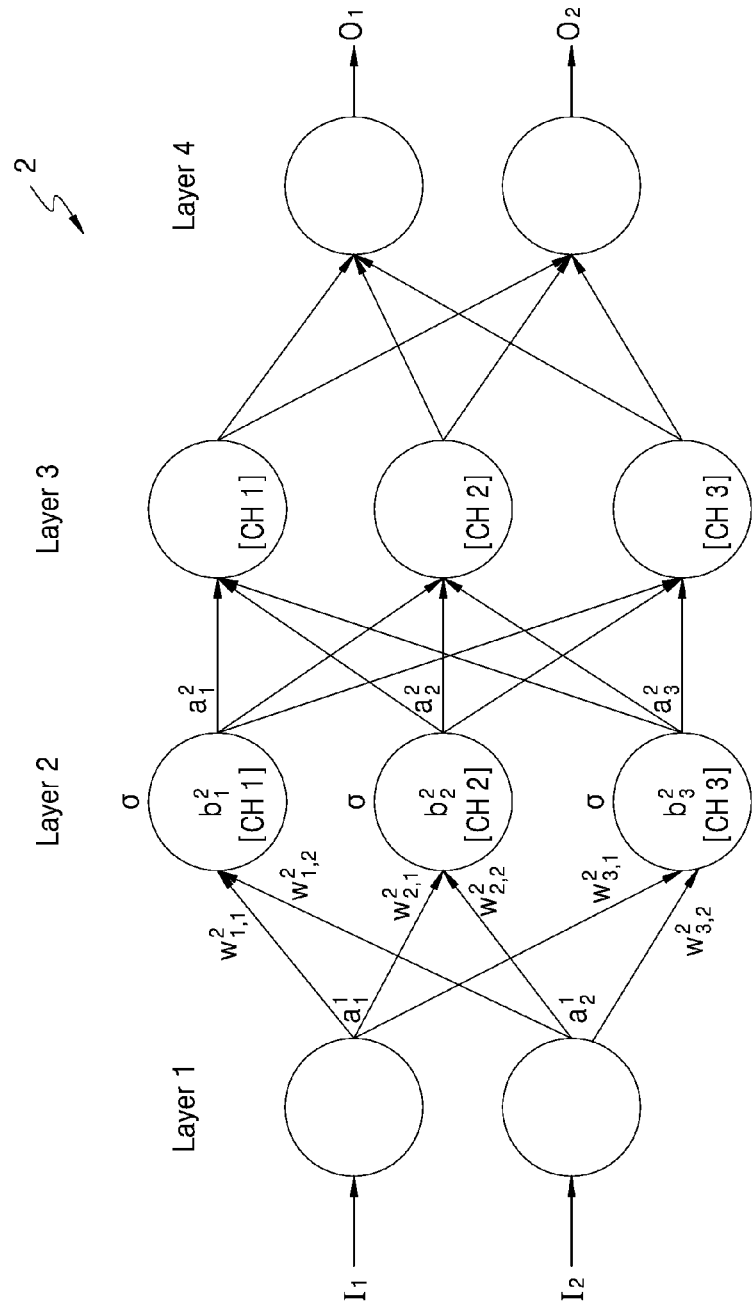
FIG. 2 is a diagram illustrating an example neural network architecture.

FIG. 2 is a diagram illustrating an example neural network architecture.

In FIG. 2, a neural network 2 has a structure including an input layer, hidden layers, and an output layer. The neural network 2 may operate based on received input data (e.g., $I_1$ and $I_2$) and may generate output data (e.g., $O_1$ and $O_2$) based on the result of performing the operation.

The neural network 2 may be a DNN or n-layer neural network, including two or more hidden layers, as described above. For example, as shown in FIG. 2, the neural network 2 may be a DNN, including an input layer Layer1, two hidden layers Layer2 and Layer3, and an output layer Layer4. When the neural network 2 is implemented with the DNN architecture, the neural network 2 includes more layers capable of processing valid information and thus may process data sets of higher complexity than a neural network having a single layer. The neural network 2 is shown as including four layers, but this is only an example and the neural network 2 may include fewer or more layers, or may include fewer or more nodes. That is, the neural network 2 may include layers of various structures different from those shown in FIG. 2.

Each of the layers included in the neural network 2 may include a plurality of nodes. Each of the nodes may correspond to a plurality of artificial nodes, known as neurons, PEs, units, or similar terms. For example, as shown in FIG. 2, the input layer Layer 1 may include two nodes (channels), and the hidden layers Layer 2 and Layer 3 may each include three channels. However, this is only an example, and each of the layers included in the neural network 2 may include various numbers of nodes (channels).

Nodes included in each of the layers of the neural network 2 may be connected to each other to process data. For example, one node may receive data from other nodes and compute the data and may output a computation result to other nodes.

The input and output of each of the nodes may be referred to as input activation and output activation, respectively. That is, the activation may be an output of one node and may also be a parameter corresponding to the input of nodes included in a next layer. Each of the nodes may determine its own activation based on activations, which are received from nodes included in a previous layer, a weight, and a bias. The weight is a parameter used to calculate the output activation in each node, and may be a value assigned to a connection relationship between the nodes though iterative training.

Each of the nodes may be processed as or by a computational unit or processing element that receives an input and outputs an output activation, so the input-output of each of the nodes may be mapped. For example, when $\sigma$ is an activation function, $w_{jk}^{i}$ is a weight from a k-th node) included in an (i−1)-th layer to a j-th node included in an i-th layer, $b_j^i$ is a bias of the j-th node included in the i-th layer, and $a_j^i$ is the activation of the j-th node included in the i-th layer, the activation a may be calculated using Equation 1 as follows.

$$a_j^i = \sigma\left(\sum_k \left(w_{jk}^i \times a_k^{i-1}\right) + b_j^i\right) \quad \text{Equation 1}$$

As shown in FIG. 2, the activation of a first node illustrated of a second layer (i.e., the hidden layer Layer2) may be represented by a may have a value of $a_1^2=\sigma(w_{1,1}^2 \times a_1^1 + w_{1,2}^2 \times a_2^1 + b_1^2)$ according to Equation 1. However, Equation 1 described above is only an example for describing activation, weight, and bias used for processing data in the neural network 2, but is not limited thereto. The activation may be a value obtained by passing a weighted sum of activations received from a previous layer to an activation function such as a sigmoid function or a rectified linear unit (ReLU) function.

As described above, in the neural network 2, a large number of data sets are exchanged between a plurality of interconnected nodes and under a number of computing processes through layers. Accordingly, there is a need for a technique capable of reducing power consumption required for reading or writing a large amount of data required for a number of computing processes.

FIGS. 1 and 2 illustrate only a schematic architecture of the neural network 2 for convenience of description. However, the neural network 2 may be implemented with more or fewer layers, feature maps, weight maps, etc., unlike those illustrated in FIGS. 1 and 2, and the sizes thereof are also be variously modified in various other examples.

Figure 3:
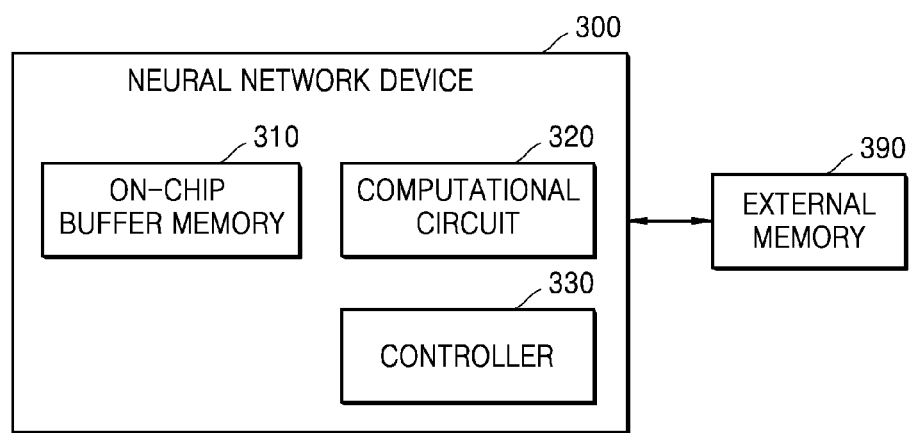
FIG. 3 is a block diagram of an example neural network device.

FIG. 3 is a block diagram of an example neural network device 300.

In FIG. 3, the neural network device 300 may include an on-chip buffer memory 310, a computational circuit 320, and a controller 330, and may transmit and receive data to and from an external memory 390 that is outside of the neural network device 300. The neural network device 300 is a device having an on-chip structure, and components in the neural network device 300 may be mounted in one chip.

The neural network device 300 may be a hardware accelerator designed to be suitable for implementing a neural network. The neural network device 300 may be used to improve the processing speed of an electronic system including the neural network device 300 as an accelerator.

In the neural network device 300 illustrated in FIG. 3, the neural network device 300 may further include other general purpose components in addition to the components illustrated in FIG. 3.

The on-chip buffer memory 310 refers to a memory provided in a chip corresponding to the neural network device 300. The on-chip buffer memory 310 may reduce the movement of a feature map to the neural network device 300 by storing an input feature map and an output feature map together, e.g., compared to a typical neural network device. Accordingly, access to the external memory 390, which is required for reading/writing the input feature map or the output feature map in such typical examples, may be reduced.

The on-chip buffer memory 310 may be configured as one memory address space. The memory address space is a space defining a range of memory addresses for storing data, and refers to a space in which a feature map to which a memory address is allocated may be stored. For example, when the range of memory addresses corresponding to the memory address space of the on-chip buffer memory 310 is 0x0000 to 0xFFFF, the input feature map or the output feature map is allocated a memory address corresponding to, at least, a portion of 0x0000 to 0xFFFF, and thus may be stored in the on-chip buffer memory 310. Typical memory provided in a typical neural network device includes a plurality of memory address spaces. The input feature map in a memory address space stored is separated from the memory address space in which the output feature map is stored. In contrast, the on-chip buffer memory 310, according to one or more embodiments, may store the input feature map and the output feature map together in one memory address space.

The on-chip buffer memory 310 may store the input feature map and the output feature map together in one memory address space, and thus may reduce a capacity of the on-chip buffer memory 310, to reduce the area occupied by the neural network device 300 compared to a typical neural network device. In a typical memory that stores an input feature map and an output feature map in separate buffer memories or in separate memory address spaces within one buffer memory, a space capable of accommodating the sum of the maximum size of the input feature map and the maximum size of the output feature map is required.

For example, when the sizes of an input feature map and an output feature map of a first layer are 2 megabyte (MB) and 6 MB, respectively, and the sizes of an input feature map and an output feature map of a second layer is 7 MB and 1 MB, respectively, the typical buffer memory must have a capacity capable of accommodating, at least, 13 MB of data. In contrast, in the above-described example, the on-chip buffer memory 310, according to the embodiments, may only have a capacity capable of accommodating 8 MB of data, as a non-limiting example. A memory address allocation method for storing the input feature map and the output feature map together in one address space of the on-chip buffer memory 310 will be further described with reference to FIG. 4.

The on-chip buffer memory 310 uses a single port. The use of a single port by the on-chip buffer memory 310 may mean that a port used for a read operation on a feature map and a port used for a write operation on a feature map are the same. The on-chip buffer memory 310 may move a feature map stored in one memory address space through a single port connected to the one memory address space. The on-chip buffer memory 310 using a single port may have half the area and power consumption compared to the typical buffer memory using a dual-port having the same capacity. In other words, when the area of the on-chip buffer memory 310 using a single port and the area of the typical buffer memory using a dual port are the same, the on-chip buffer memory 310 using a single port may have twice the capacity of the typical buffer memory using a dual port.

The width of a single port of the on-chip buffer memory 310 may be determined according to a storage unit of the feature map. The width of a single port may be determined by TN words. TN is the degree of parallelism of the feature map. The degree of parallelism is a variable that represents the unit of features that constitute a feature map and may be processed in a single operation. The word refers to the number of bits required to represent data corresponding to one feature. The number of bits corresponding to one word may be determined according to a decimal point format of the data, for example. The decimal point format may be selected as a floating-point format or a fixed-point format in various examples of the neural network device 300.

In an embodiment, the on-chip buffer memory 310 may store an input feature map of a first layer included in the neural network. The first layer is not limited to a first layer in the neural network, but refers to any one of several layers included in the neural network and is a term for distinguishing one layer from other layers.

The computational circuit 320 may be a hardware configuration for outputting an output feature map corresponding to the input feature map by performing a neural network operation on the input feature map. For example, the computational circuit 320 may receive an input feature map of the first layer through a single port of the on-chip buffer memory 310 and perform a neural network operation on the input feature map to output an output feature map of the first layer.

In an example, the neural network operation may include a convolution operation, an activation operation, and a pooling operation. The computational circuit 320 may perform an activation operation on the result of a convolution operation on the input feature map, perform a pooling operation on the result of the activation operation, and output the result of the pooling operation as an output feature map. In an example, all three operations in the computational circuit 320 may be performed in one chip without access to an external memory. The operation of the computational circuit 320 may include various operations used for the operation of the neural network, such as batch normalization, in addition to the operations described above.

The controller 330 may play an overall role for controlling the neural network device 300. For example, the controller 330 may control the operation of the on-chip buffer memory 310. The controller 330 may be implemented as an array of a plurality of logic gates, or may be implemented as a combination of a general microprocessor and a memory in which instructions that may be executed in the microprocessor is stored.

The controller 330 may transmit an input feature map stored in the on-chip buffer memory 310 from the on-chip buffer memory 310 to the computational circuit 320 through a single port of the on-chip buffer memory 310. The controller 330 may transmit an output feature map, which is an output result of a neural network operation on the input feature map, to the on-chip buffer memory 310 through a single port of the on-chip buffer memory 310.

The controller 330 may store the input feature map and the output feature map together in the on-chip buffer memory 310. For example, the controller 330 may transmit the output feature map of the first layer to the on-chip buffer memory 310 through a single port of the on-chip buffer memory 310 and store the output feature map of the first layer and the input feature map of the first layer together in the on-chip buffer memory 310. The output feature map of the first layer may be reused as an input feature map for a neural network operation of the second layer, which is the next layer of the first layer.

When a feature map is reused using the on-chip buffer memory 310, access to the external memory 390 for the writing and reading of the feature map may be excluded, e.g., compared to the typical neural network device, since the feature map is moved and stored only in the neural network device 300 having an on-chip structure.

Figure 4:
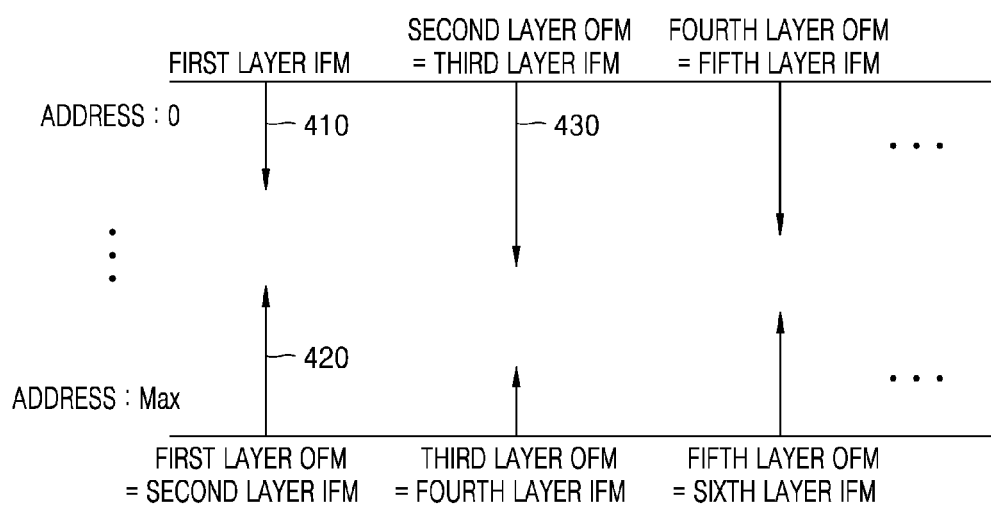
FIG. 4 is a diagram illustrating an example memory address allocation scheme for storing a feature map in an on-chip buffer memory.

FIG. 4 is a diagram illustrating an example memory address allocation scheme for storing a feature map in an on-chip buffer memory.

In order to store an input feature map and an output feature map together in one memory address space, a neural network device (e.g., the neural network device 300 of FIG. 3) adopts a method of adjusting a point and direction for allocating a memory address of a feature map to an on-chip buffer memory.

The neural network device may allocate memory addresses for storing an input feature map and an output feature map in a certain layer in opposite directions. For example, when a memory address of any one of the input feature map and the output feature starts to be allocated from the start point (memory address: 0) of the memory address and is allocated in a direction toward the last point (memory address: Max) of the memory address, a memory address of the other of the input feature map and the output feature map may start to be allocated from the last point of the memory address and be allocated in a direction toward the start point of the memory address.

In an example of FIG. 4, a first memory address 410 of an on-chip buffer memory for storing the input feature map of the first layer may start to be allocated from the start point of the memory address and be allocated in a direction toward the last point of the memory address, and a second memory address 420 of an on-chip buffer memory for storing the output feature map of the first layer may start to be allocated from the last point of the memory address and be allocated in a direction toward the start point of the memory address.

As the output feature map of the first layer stored in the second memory address 420 is reused as the input feature map of the second layer, the output feature map of the second layer corresponding to the input feature map of the second layer may be output from the computational circuit. A third memory address 430 of an on-chip buffer memory for storing the output feature map of the second layer may start to be allocated from the start point of the memory address and be allocated in a direction toward the last point of the memory address.

Due to the memory address allocation scheme according to FIG. 4, the neural network device may store an input feature map and an output feature map together while reducing an overlap between the input feature map and the output feature map in one memory address space. The neural network device may reduce access to an external memory by storing both the input feature map and the output feature map in an on-chip buffer memory. Both storage and movement of the feature map may be performed in the neural network device having an on-chip structure.

As described above, the neural network device may both move and store the feature map inside the neural network device having an on-chip structure, thereby reducing power consumption generated by access to an external memory. However, when it is difficult to store an input feature map and an output feature map together in an on-chip buffer memory based on the total size of the input feature map and the output feature map, the neural network device may operate in a compatibility mode. Hereinafter, a case where the input feature map and the output feature map may not be stored together in the on-chip buffer memory despite the memory address allocation scheme of FIG. 4 will be further described with reference to FIG. 5.

Figure 5:
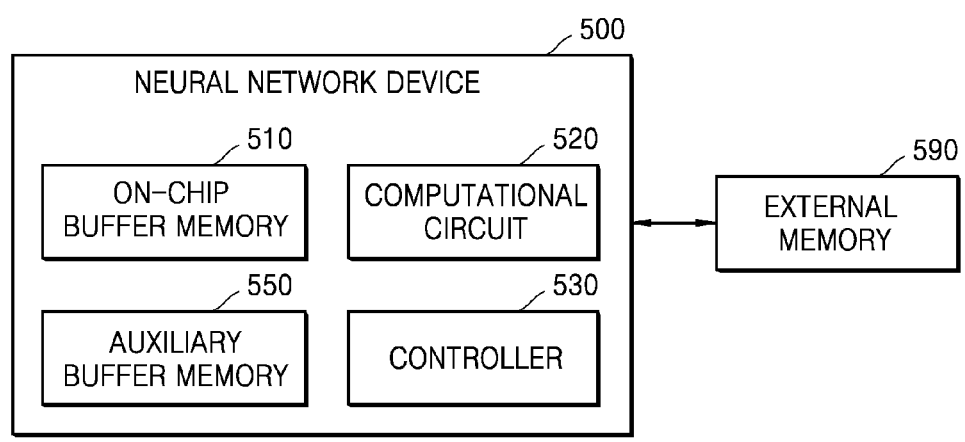
FIG. 5 is a block diagram of an example neural network device.

FIG. 5 is a block diagram of an example neural network device 500.

In FIG. 5, the neural network device 500 may include an on-chip buffer memory 510, a computational circuit 520, a controller 530, and an auxiliary buffer memory 550. The neural network device 500 may transmit and receive data to and from an external memory 590 that is outside of the neural network device 500. The neural network device 500 is a device having an on-chip structure, and components in the neural network device 500 may be mounted in one chip. The on-chip buffer memory 510, the computational circuit 520, and the controller 530 of FIG. 5 may correspond to the on-chip buffer memory 310, the computational circuit 320, and the controller 330 of FIG. 3, respectively. Therefore, repeated descriptions are omitted.

The controller 530 may determine whether the total size of an input feature map and an output feature map exceeds the size of the on-chip buffer memory 510. When the neural network device 500 may not store the input feature map and the output feature map together in the on-chip buffer memory 510 because the total size of the input feature map and the output feature map exceeds the size of the on-chip buffer memory 510, the neural network device 500 may select to operate in a compatibility mode. In the compatibility mode, the neural network device 500 may use the auxiliary buffer memory 550 in addition to the on-chip buffer memory 510 to storing a feature map.

The auxiliary buffer memory 550 may select to operate only in the compatibility mode. When an output feature map output from the computational circuit 520 may not be stored in the on-chip buffer memory 510, the auxiliary buffer memory 550 may temporarily hold the output feature map. The auxiliary buffer memory 550 may temporarily hold the output feature map, and the output feature map temporarily held in the auxiliary buffer memory 550 may be transmitted to the external memory 590 according to a preset cycle. The output feature map may be stored in the external memory 590, transferred from the external memory 590 to the computational circuit 520, and reused as an input feature map for a neural network operation of a next layer.

Figure 6:
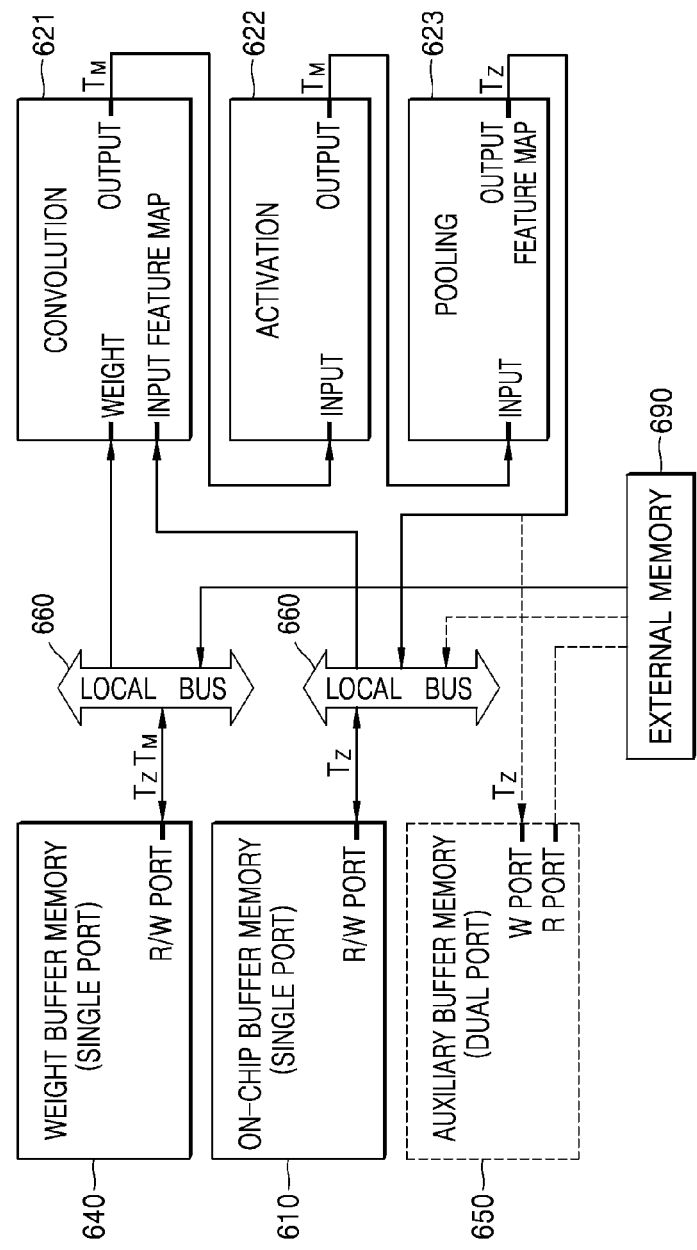
FIG. 6 is a diagram illustrating an example movement path of a feature map of a neural network device.

FIG. 6 is a diagram illustrating an example movement path of a feature map of a neural network device.

In FIG. 6, the neural network device includes a weight buffer memory 640, an on-chip buffer memory 610, an auxiliary buffer memory 650, a local bus 660. The neural network may also include, for example. a computational circuit, and a controller. The on-chip buffer memory 610, the computational circuit, the auxiliary buffer memory 650, and the controller of FIG. 6 may correspond to the on-chip buffer memory 510, the computational circuit 520, the auxiliary buffer memory 550, and the controller 530 of FIG. 5, respectively, and thus, repeated descriptions thereof are omitted. The computational circuit may include a convolution operation circuit 621, an activation operation circuit 622, and a pooling operation circuit 623. The external memory 690 is external to the neural network device.

TZ is the degree of parallelism of an input feature map, and is a variable representing the unit of features that constitute an input feature map and may be processed in a single operation. TM is the degree of parallelism of an output feature map, and is a variable representing the unit of features that constitute an output feature map and may be processed in a single operation.

Access of the neural network device to the external memory 690 is made in the process of inputting external data to a first layer (input layer) of the neural network device, the process of outputting data from a last layer (output layer) of the neural network device, and the process of reading weights. In other layers, operations of the neural network device, such as moving, computing, and storing a feature map, may be all performed inside the neural network device having an on-chip structure without access to the external memory 690.

The weight buffer memory 640 may store a weight used for a neural network operation on an input feature map. The weight buffer memory 640 may use a single port. The weight buffer memory 640 may receive a weight from the external memory 690 through the single port. The weight buffer memory 640 may transmit the weight to the convolution operation circuit 621 through the single port, for a neural network operation on the input feature map. The convolution operation circuit 621 may perform a convolution operation on the input feature map based on the weight.

The input feature map stored in the on-chip buffer memory 610 may be transmitted to the convolution operation circuit 621 and a convolution operation on the input feature map may be performed based on the weight. The result of performing the convolution operation on the input feature map may be input to the activation operation circuit 622, and then an activation operation may be performed. The result of performing the activation operation may be input to the pooling operation circuit 623, and a pooling operation may be directly performed. The output feature map output as a result of performing the pooling operation may be transmitted to the on-chip buffer memory 610 and stored together with the input feature map. However, when the total size of the input feature map and the output feature map exceeds the size of the on-chip buffer memory 610 and thus the neural network device may not store the input feature map and the output feature map together in the on-chip buffer memory 610, the neural network device may operate in a compatibility mode. When the neural network device selects to operate in a compatibility mode, the auxiliary buffer memory 650 may operate. When the total size of an input feature map stored in the on-chip buffer memory 610 and an output feature map output from the pooling operation circuit 623 exceeds the size of the on-chip buffer memory 610, the controller (e.g., the controller 330 of FIG. 3 or the controller 530 of FIG. 5) may temporarily hold the output feature map in the auxiliary buffer memory 650. The output feature map may be temporarily held in the auxiliary buffer memory 650 and transmitted to the external memory 690 according to a preset period.

For example, when the total size of an input feature map of a second layer stored in the on-chip buffer memory 610 and an output feature map of the second layer output from the computational circuit exceeds the size of the on-chip buffer memory 610, the controller may temporarily hold the output feature map of the second layer in the auxiliary buffer memory 650.

When an input feature map is stored in the external memory 690, the controller may determine a storage location of an output feature map based on whether the size of the output feature map exceeds the size of the on-chip buffer memory 610. For example, when an output feature map of the second layer is stored in the external memory 690 and the output feature map of the second layer is reused as an input feature map of a third layer, the controller may determine whether the size of an output feature map of the third layer output from the computational circuit exceeds the size of the on-chip buffer memory 610. When the size of the output feature map of the third layer exceeds the size of the on-chip buffer memory 610, the controller may temporarily hold the output feature map of the third layer in the auxiliary buffer memory 650. When the size of the output feature map of the third layer is less than or equal to the size of the on-chip buffer memory 610, the controller may store the output feature map of the third layer in the on-chip buffer memory 610.

However, even when the neural network device selects to operate in a compatibility mode and stores a feature map in the external memory 690, a minimum portion of the feature map, which is necessary for reuse of the feature map, may be stored in the on-chip buffer memory 610 and the remaining portion may be stored in the external memory 690.

The neural network device may reduce the size of the output feature map by processing a pooling operation within the computational circuit rather than processing the pooling operation in a separate layer. For example, the size of the output feature map may be reduced by the square of a pooling stride by a pooling operation. Thus, the possibility of storing the output feature map in the on-chip buffer memory 610 may be increased, and access to the external memory 690 may be reduced.

The local bus 660 is a moving path of data (feature map or weight) that is between buffer memories and other components, in which a single port is used. The feature map may be moved between the on-chip buffer memory 610 and the computational circuit via the local bus 660. The weight may be moved between the weight buffer memory 640 and the external memory 690 or the computational circuit via the local bus 660. When a large amount of data has to be transmitted via a single port, the local bus 660 may prevent collisions on the single port. When a read operation of a feature map and a write operation of the feature map are simultaneously requested, the order of the read operation and the write operation may be adjusted on the local bus 660, and thus, a collision between the read operation and the write operation may be prevented in the single port.

FIG. 7 is an algorithm illustrating an example operation loop executed to perform a neural network operation.

M denotes the number of features in an output feature map, R and C denotes the number of rows and the number of columns in the output feature map, Z denotes the number of features in an input feature map, K denotes the size of a convolution filter, S denotes the stride of convolution, P denotes the stride of pooling, and Q denotes the size of a pooling filter.

The neural network device may execute, at least, one operation loop to perform a neural network operation. For example, the neural network device may execute an M-loop with an input feature map as an input. The M-loop is a loop that specifies the range of the number of features of an output feature map to be output. The range of the number of features may be expanded in units of TM elements in every loop. The M-loop may include an R/C-loop. The R/C-loop is a loop that specifies the rows and columns of the output feature map to be output in outputting the output feature map. The R/C-loop includes an RR-loop, a CC-loop, an R-loop, and a C-loop.

Because the R/C-loop is in the M-loop, the size of the weight buffer memory may be determined to be relatively small. That the R/C-loop is in the M-loop means that, when the process of expanding rows and columns with a fixed range of the number of features in an output feature map to be output and outputting features of the output feature map is completed, the process of expanding the rows and columns while moving the range of the number of features to be output, by TM elements, and outputting features of the output feature map are repeated.

In an example, the size of the weight buffer memory required to maximize the reuse of weights within the operation loop may be proportional to TM*Z*K2. This size is smaller than M*Z*K2 that is the size required for the weight buffer memory when the M-loop is in the R/C-loop unlike the algorithm according to FIG. 7. Due to the algorithm according to FIG. 7, the area occupied by the weight buffer memory in the neural network device may be reduced.

K-loop #1 is a loop that performs a convolution operation on an input feature map and a weight. Immediately after the convolution operation of K-loop #1 is performed, an activation operation and a pooling operation are performed in succession. As the activation operation and the pooling operation are processed in succession in one loop rather than in separate loops, the process of a neural network operation may be simplified. As the R/C-loop proceeds in succession without the intervention of other loops, the pooling operation may be easily processed in the loop.

A read request for an input feature map may be made whenever the range of features of an input feature map used in the convolution operation is changed. That is, a read operation may be requested every cycle in which the z value for the input feature map is changed in a Z-loop. A write request for an output feature map may be made whenever a row or column is changed. That is, a write operation may be requested whenever the r or c value in the R/C-loop is changed (when a cycle of K-loop #1 is completed). A read request for an input feature map whose z value changes may be made every cycle, and a write request for an output feature map whose r or c value changes may be made every K*K*Z/TZ cycles.

As the read operation is performed every cycle and the write operation is performed every K*K*Z/TZ cycles, a collision between the write operation and the read operation may occur at the single port every K*K*Z/TZ cycles. However, the frequency of the write request that occurs every K*K*Z/TZ cycles may correspond to a very low frequency compared to the frequency of the read request that occurs every cycle. For example, the frequency of collisions at the single port occurring in K*K*Z/TZ cycles is within 1% of the frequency with which the entire loop is repeated, and an impact on the operating speed of the neural network device may be very small.

Lines 700 and 710 are codes used only when the neural network device selects to operate in a compatibility mode. Line 700 is a code for reading an input feature map from an external memory when the input feature map is stored in the external memory. Line 710 is a code for writing an output feature map to the external memory.

Figure 8:
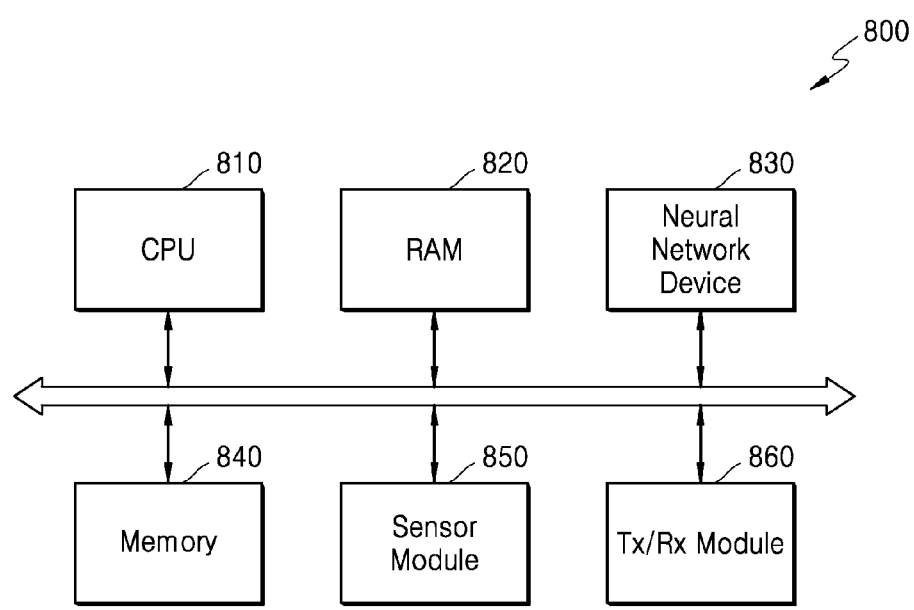
FIG. 8 is a block diagram of an example electronic system.

FIG. 8 is a block diagram of an example electronic system 800. The electronic system 800 may correspond to any or all neural network devices described with reference to FIGS. 1-7 and 9-10.

In FIG. 8, the electronic system 800 may extract valid information by analyzing input data in real time based on a neural network, and may make a situation determination or control configurations of an electronic device, on which the electronic system 800 is mounted, based on the extracted information. For example, the electronic system 800 may be applied to, or be, a robot device such as a drone and an advanced driver assistance system (ADAS), a smart TV, a smart phone, a medical device, a mobile device, an image display device, a measurement device, an Internet of Things (IoT) device, and the like. In addition, the electronic system 800 may be mounted on, at least, one of various types of electronic devices.

The electronic system 800 may include a central processing unit (CPU) 810, a random access memory (RAM) 820, a neural network device 830, a memory 840, a sensor module 850, and a communication module 860. The electronic system 800 may further include an input/output module, a security module, a power control device, and the like. Some of the hardware configurations of the electronic system 800 may be, or be mounted on, at least, one semiconductor chip. The neural network device 830 may be any or all neural network devices (e.g., the neural network device 300 of FIG. 3 or the neural network device 500 of FIG. 5) having an on-chip structure described above or an apparatus including the neural network device.

The CPU 810 controls the overall operation of the electronic system 800. The CPU 810 may include one processor core or a plurality of processor cores. The CPU 810 may process or execute instructions and/or data stored in the memory 840. In an embodiment, the CPU 810 may control a function of the neural network device 830 by executing programs stored in the memory 840. The CPU 810 may be implemented as a CPU, a graphics processing unit (GPU), an application processor (AP), or the like.

The RAM 820 may temporarily store programs, data, or instructions. For example, the instructions and/or data stored in the memory 840 may be temporarily stored in the RAM 820 under the control of the CPU 810 or boot code. The RAM 820 may be implemented as a memory such as dynamic random access memory (DRAM) or static random access memory (SRAM).

The neural network device 830 may perform an operation of the neural network based on received input data and generate an information signal based on the result of the performing. The neural network may include, but is not limited to, a CNN, an RNN, a deep belief network, a restricted Boltzman machine, or the like. The neural network device 830 may correspond to a hardware accelerator dedicated to a neural network.

The information signal may include one of various types of recognition signals such as a voice recognition signal, an object recognition signal, an image recognition signal, and a biometric information recognition signal. For example, the neural network device 830 may receive as input data frame data included in a video stream and generate from the frame data a recognition signal for an object included in an image represented by the frame data. However, the present disclosure is not limited thereto, and the neural network device 830 may receive various types of input data according to the type or function of an electronic device on which the electronic system 800 is mounted, and may generate a recognition signal according to the input data.

The memory 840 is a storage location for storing data, and may store an operating system (OS), various instructions, and various types of data. The memory 840 may correspond to the external memory 390 of FIG. 3. When intermediate results, for example, an output feature map, generated during the operation of the neural network device 830 are stored in the memory 840 for each operation, power consumption may increase due to frequent access to the memory 840. The neural network device 830 may reduce access to the memory 840 by limiting the storage of a feature map generated during the operation of the neural network device 830 to the neural network device 830. As a result, the neural network device 830 according to the disclosure may reduce power consumption. The memory 840 may also store quantized neural network data, such as parameters, weight maps, or weight lists, which are used in the neural network device 830.

The memory 840 may be a DRAM, but is not limited thereto. The memory 840 may include, at least, one of a volatile memory and a nonvolatile memory. The nonvolatile memory includes read only memory (ROM), programmable ROM (PROM), erasable programmable ROM (EPROM), electrically erasable and programmable ROM (EEPROM), flash memory, phase-change RAM (PRAM), magnetic RAM (MRAM), resistive RAM (RRAM), ferroelectric RAM (FRAM), or the like. The volatile memory includes DRAM, SRAM, synchronous DRAM (SDRAM), PRAM, MRAM, RRAM, FRAM, or the like. In an embodiment, the memory 840 may include, at least, one of a hard disk drive (HDD), a solid state drive (SSD), a compact flash (CF), a secure digital (SD), a micro-SD, a mini-SD, an extreme digital (xD), or a memory stick.

The sensor module 850 may collect information around the electronic device on which the electronic system 800 is mounted. The sensor module 850 may sense or receive a signal (e.g., an image signal, an audio signal, a magnetic signal, a bio signal, or a touch signal) from the outside of the electronic device and convert the sensed or received signal into data. To this end, the sensor module 850 may include, at least, one of various types of sensing devices such as a microphone, an imaging device, an image sensor, a light detection and ranging (LIDAR) sensor, an ultrasonic sensor, an infrared sensor, a bio sensor, and a touch sensor.

The sensor module 850 may provide the converted data as input data to the neural network device 830. For example, the sensor module 850 may include an image sensor and may generate a video stream by capturing the external environment of the electronic device and provide, in order, consecutive data frames of the video stream as input data to the neural network device 830. However, the present disclosure is not limited thereto, and the sensor module 850 may provide various types of data to the neural network device 830.

The communication module 860 may include various wired or wireless interfaces for communicating with an external device. For example, the communication module 860 may include a communication interface connectable to a wired local area network (LAN), a wireless local area network (WLAN) such as wireless fidelity (Wi-Fi), a wireless personal area network (WPAN) such as Bluetooth, a wireless universal serial bus (USB), a zigbee, a near field communication (NFC), a radio-frequency identification (RFID), a power line communication (PLC), or a mobile cellular network such as 3rd generation (3G), 4th generation (4G), or long term evolution (LTE).

Figure 9:
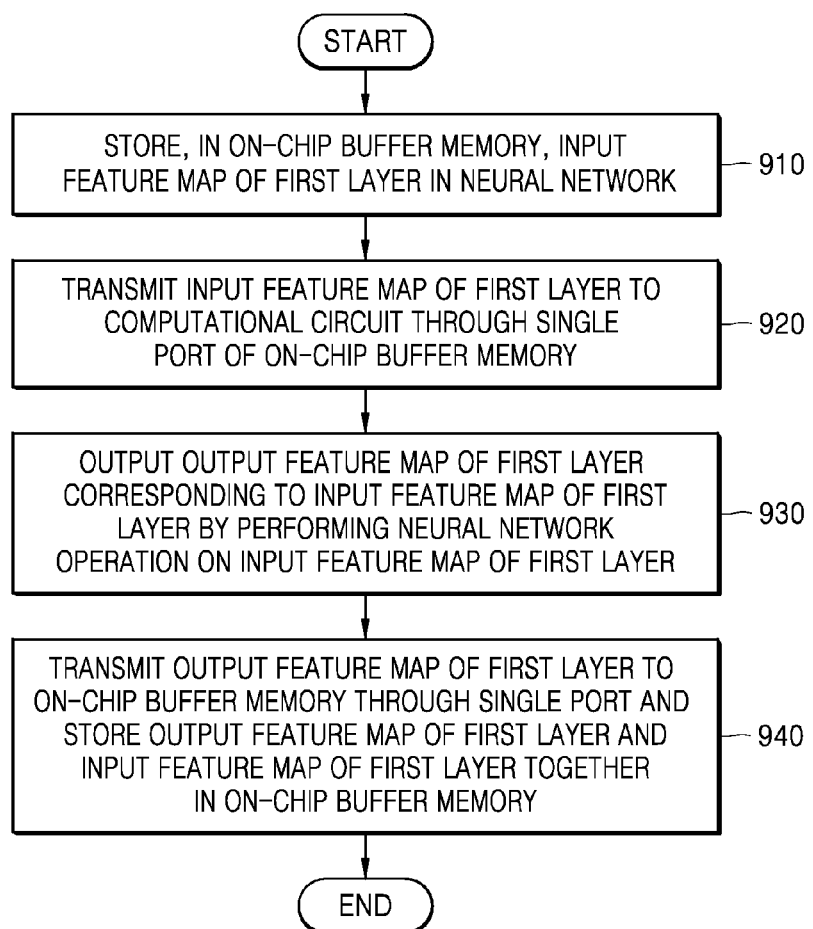
FIG. 9 is a flowchart illustrating an example operating method of a neural network device.

FIG. 9 is a flowchart illustrating an example operating method of a neural network device.

In FIG. 9, the operating method of a neural network device includes operations processed in time series in the neural network device 300 illustrated in FIG. 3 or the neural network device 500 illustrated in FIG. 5. Therefore, even if omitted below, the description of the neural network device given above with reference to FIGS. 3 to 8 may be applied to the method of FIG. 9.

In Operation 910, the neural network device may store, in an on-chip buffer memory, an input feature map of a first layer in a neural network.

In Operation 920, the neural network device may transmit the input feature map of the first layer to a computational circuit through a single port of the on-chip buffer memory.

In Operation 930, the neural network apparatus may output an output feature map of the first layer corresponding to the input feature map of the first layer by performing a neural network operation on the input feature map of the first layer.

The neural network device may perform the neural network operation based on one or more operation loops. The neural network device may perform a read operation of reading data constituting, at least, a portion of the input feature map of the first layer from the on-chip buffer memory through the single port at each cycle in which each of the one or more operation loops is executed. However, when a write operation for writing data constituting, at least, a portion of the output feature map of the first layer to the on-chip buffer memory through the single port is requested at a timing at which the read operation is to be performed, the write operation may be performed in preference to the read operation.

The neural network operation may include a convolution operation, an activation operation, and a pooling operation, and the neural network device may output, as the output feature map of the first layer, the result of performing a pooling operation as well as a convolution operation and an activation operation on the input feature map of the first layer.

In Operation 940, the neural network device may transmit the output feature map of the first layer to the on-chip buffer memory through the single port and store the output feature map of the first layer and the input feature map of the first layer together in the on-chip buffer memory.

The neural network device may allocate a first memory address of the on-chip buffer memory for storing the input feature map of the first layer and a second memory address of the on-chip buffer memory for storing the output feature map of the first layer in different directions, thereby reducing an overlap between the first memory address and the second memory address.

The neural network device may allocate a first memory address in a first direction from a start point of a memory address corresponding to a storage space of the on-chip buffer memory and allocate a second memory address in a second direction opposite to the first direction from a last point of the memory address corresponding to the storage space of the on-chip buffer memory.

When the output feature map of the second layer corresponding to the input feature map of the second layer is output from the computational circuit as the output feature map of the first layer stored in the second memory address is reused as the input feature map of the second layer, the neural network device may allocate a third memory address of the on-chip buffer memory for storing the output feature map of the second layer in the first direction from the start point, thereby reducing an overlap between the second memory address and the third memory address.

In an embodiment, the neural network device may store, in a weight buffer memory, a weight of the first layer used for a neural network operation on the input feature map of the first layer. The weight buffer memory may receive the weight of the first layer from an external memory external to the neural network device through a single port of the weight buffer memory. The weight buffer memory may transmit the weight of the first layer to the computational circuit through a single port of the weight buffer memory.

The on-chip buffer memory, the computational circuit, and a controller of the neural network device may be mounted in a single chip. Each of the operations in FIG. 9 may be performed in a single chip.

In an example, when the output feature map of the second layer corresponding to the input feature map of the second layer is output from the computational circuit, the neural network device may determine whether the total size of the input feature map of the second layer and the output feature map of the second layer exceeds the size of the on-chip buffer memory. When it is determined that the total size of the input feature map of the second layer and the output feature map of the second layer exceeds the size of the on-chip buffer memory, the neural network device may temporarily store the output feature map of the second layer in an auxiliary buffer memory instead of the on-chip buffer memory. The output feature map of the second layer temporarily stored in the auxiliary buffer memory may be transmitted to an external memory outside the neural network device according to a preset period.

The neural network device may output, from the computational circuit, an output feature map of a third layer corresponding to an input feature map of the third layer as the output feature map of the second layer is reused as an input feature map for a neural network operation of the third layer, the third layer being a next layer of the second layer.

The neural network device may determine whether the size of the output feature map of the third layer exceeds the size of the on-chip buffer memory. When it is determined that the size of the output feature map of the third layer exceeds the size of the on-chip buffer memory, the neural network device may temporarily store the output feature map of the third layer in the auxiliary buffer memory. When it is determined that the size of the output feature map of the third layer is less than or equal to the size of the on-chip buffer memory, the neural network device may store the output feature map of the third layer in the on-chip buffer memory.

Figure 10:
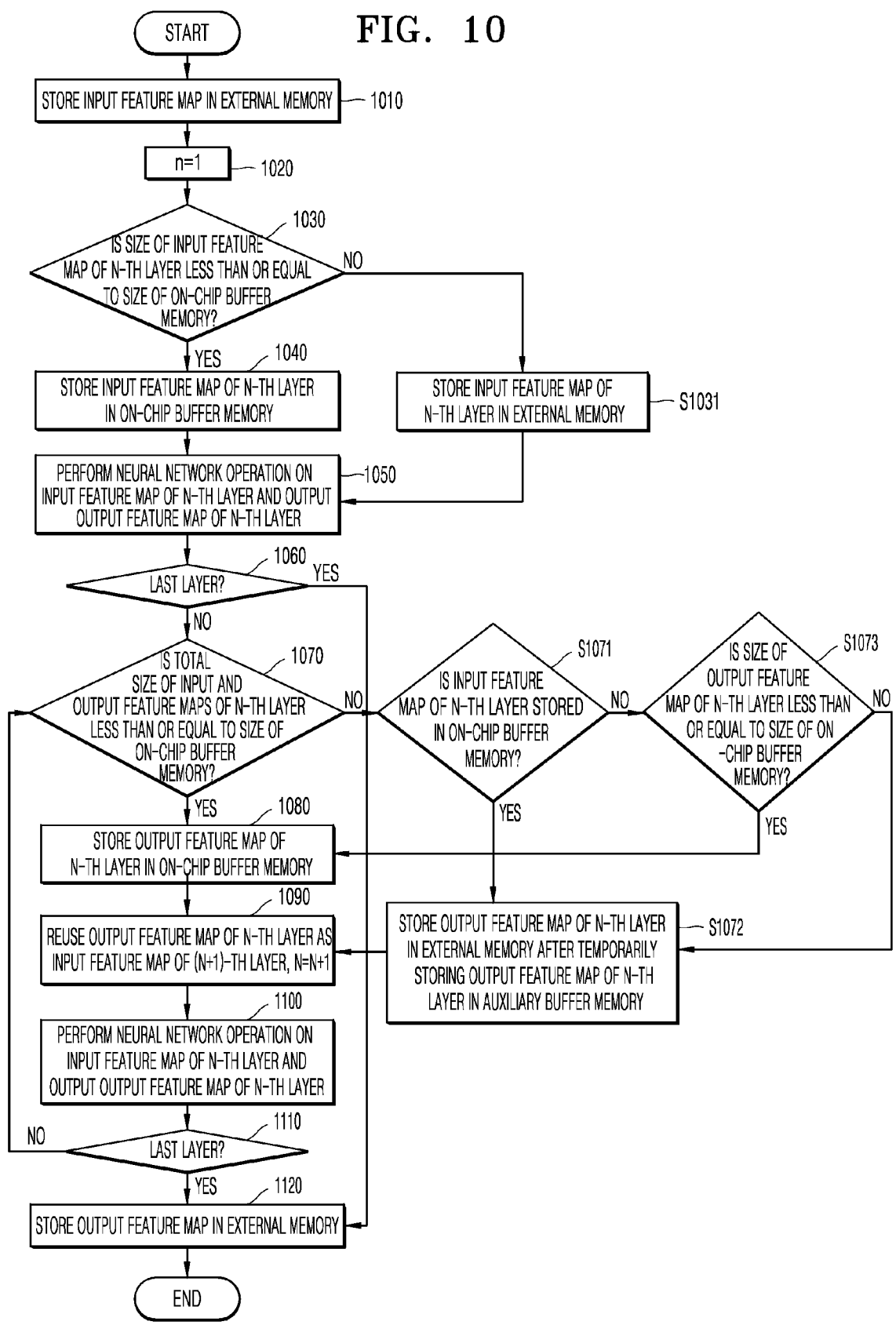
FIG. 10 is a flowchart illustrating an example operating method of a neural network device.

FIG. 10 is a flowchart illustrating an example operating method of a neural network device.

In FIG. 10, the operating method of a neural network device includes operations processed in time series in the neural network device 300 illustrated in FIG. 3 or the neural network device 500 illustrated in FIG. 5. Therefore, even if omitted below, the description of the neural network device given above with reference to FIGS. 3 to 8 may be applied to the method of FIG. 10.

A principle operation method of a neural network device according to the disclosure is a method of storing an input feature map and an output feature map together in an on-chip buffer memory. However, an exceptional case, in which the input feature map and the output feature map may not be stored together in the on-chip buffer memory, may occur. In order to prepare for such an exceptional case, the neural network device according to the disclosure may operate in a compatibility mode in addition to the principle operation method. When the total size of the input feature map and the output feature map exceeds the size of the on-chip buffer memory, the neural network device may operate in a compatibility mode as an exception. FIG. 10 is a diagram illustrating an overall operation process including the principle operation method and the compatibility mode of the neural network device.

Operations S1031, S1071, S1072, and S1073 in FIG. 10 refer to operations in a case where the neural network device selects to operate in the compatibility mode.

In FIG. 10, an operation method from a first layer (input layer) of the neural network device to a last layer (output layer) of the neural network device is illustrated. 'n' represented in FIG. 10 indicates an order of layers in the neural network device. For example, when the neural network device includes a total of five layers, 'n=1' refers to a first layer, 'n=2' refers to a second layer, and 'n=5' refers to a last layer.

In Operation 1010 and Operation 1020, the neural network device may store an input feature map of the first layer (n=1), which is first generated when external data is input, in an external memory. When it is determined, in Operation 1030, that the size of the input feature map of the first layer is less than or equal to the size of the on-chip buffer memory, the neural network device may perform Operation 1040. In Operation 1040, the neural network device may store the input feature map of the first layer in the on-chip buffer memory. When it is determined, in Operation 1030, that the size of the input feature map of the first layer exceeds the size of the on-chip buffer memory, the neural network device may perform Operation 1031. In Operation S1031, the neural network device may operate in a compatibility mode to store the input feature map of the first layer in the external memory. In Operation 1050, the neural network device may transmit the input feature map of the first layer to a computational circuit to perform a neural network operation and output an output feature map of the first layer.

When it is determined, in Operation 1060, that the first layer is the last layer, the neural network device may perform Operation 1120. In Operation 1120, the neural network device may store the output feature map of the first layer in the external memory. When it is determined, in Operation 1060, that the first layer is not the last layer, the neural network device may perform Operation 1070. When it is determined, in Operation 1070, that the total size of the input and output feature maps of the first layer is less than or equal to the size of the on-chip buffer memory, the neural network device may perform Operation 1080. In Operation 1080, the neural network device may store the output feature map of the first layer in the on-chip buffer memory. When it is determined, in Operation 1070, that the total size of the input and output feature maps of the first layer exceeds the size of the on-chip buffer memory, the neural network device may enter into Operation S1071 and operate in a compatibility mode.

When it is determined, in Operation 1071, that the input feature map of the first layer is stored in the on-chip buffer memory according to Operation 1040, the neural network device may perform Operation S1072. In Operation S1072, the neural network device may temporarily store the output feature map of the first layer in an auxiliary buffer memory. In Operation S1072, the output feature map of the first layer temporarily stored in the auxiliary buffer memory may be transferred to the external memory and stored in the external memory. When it is determined, in Operation 1071, that the input feature map of the first layer is stored in the external memory according to Operation 1031, the neural network device may enter into Operation S1073.

When it is determined, in Operation 1073, that the size of the output feature map of the first layer is less than or equal to the size of the on-chip buffer memory, the neural network device may perform Operation 1080. In Operation 1080, the neural network device may store the output feature map of the first layer in the on-chip buffer memory. When it is determined, in Operation 1073, that the size of the output feature map of the first layer exceeds the size of the on-chip buffer memory, the neural network device may perform Operation S1072. In Operation S1072, the neural network device may store the output feature map of the first layer in the auxiliary buffer memory.

In Operation 1090, the neural network device may reuse the output feature map of the first layer as an input feature map of the second layer (n=2). As the output feature map of the first layer is reused as the input feature map of the second layer, next layers in subsequent operations may correspond to 'n=n+1'. In Operation 1100, the neural network device may transmit the input feature map of the second layer to the computational circuit to perform a neural network operation and output an output feature map of the second layer.

In Operation 1110, the neural network device determines whether the second layer is the last layer. When it is determined that the second layer is the last layer, the neural network device may perform Operation 1120. In Operation 1120, the neural network device may store an output feature map in the external memory. When it is determined that the second layer is not the last layer, the neural network device may perform Operation 1170 to determine whether to operate in a compatibility mode based on the total size of the input and output feature maps of the second layer.

Subsequently, the same aforementioned process is performed on next layers as Operation 1090 is repeated, and when the last layer is reached, the neural network device may store an output feature map of the last layer of the neural network in the external memory and terminate the operation of the neural network device.

The neural network devices, neural network device 300, 500, 830, on-chip memory 310, 510, computational circuit 320, 520, controller 330, 550, external memory 390, 590, auxiliary buffer 550, CPU 810, RAM 820, memory 840, sensor module 850, and Tx/Rx module 860 in FIGS. 1-10 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A neural network device, comprising:
   an on-chip buffer memory configured to store an input feature map of a first layer of a neural network;
   a local bus connecting the on-chip buffer memory to a computational circuit;
   the computational circuit configured to receive the input feature map of the first layer as read from a single port of the on-chip buffer memory, and as transmitted from the single port to the computational circuit via the local bus, and perform a neural network operation on the input feature map of the first layer to output an output feature map of the first layer corresponding to the input feature map of the first layer; and a controller configured to control transmission of the output feature map of the first layer to be outputted from the computational circuit via the local bus to the on-chip buffer memory to store the output feature map of the first layer and the input feature map of the first layer together in the on-chip buffer memory, wherein the output feature map of the first layer is reused, from the on-chip buffer memory, as an input feature map for a neural network operation of a second layer subsequent to the first layer, wherein, when a read operation of the input feature map of the first layer and a write operation of the output feature map of the first layer are simultaneously requested, an order of the read operation and the write operation are adjusted on the local bus, to prevent a collision between the read operation and the write operation in the single port, wherein the computational circuit is further configured to perform the neural network operation based on one or more operation loops, wherein the controller is further configured to perform the read operation of reading data constituting, at least, a portion of the input feature map of the first layer from the on-chip buffer memory through the single port at each cycle in which each of the one or more operation loops is executed, and when the write operation for writing data constituting, at least, a portion of the output feature map of the first layer to the on-chip buffer memory through the single port is requested at a timing at which the read operation is to be performed, the write operation is performed in preference to the read operation.

2. The neural network device of claim 1, wherein the read operation is performed whenever a range of features of the input feature map of the first layer is changed, and wherein the write operation is performed whenever a number of rows or a number of columns in the output feature map of the first layer is changed.

3. The neural network device of claim 1, wherein the controller allocates, in different memory address directions of the one memory address space, a first memory address of the on-chip buffer memory for storing the input feature map of the first layer and a second memory address of the on-chip buffer memory for storing the output feature map of the first layer concurrent with the storing of the input feature map at the first memory address, allocates the first memory address in a first direction from a start point of the one memory address space of the on-chip buffer memory, and allocates the second memory address in a second direction, opposite to the first direction, from a last point of the one memory space of the on-chip buffer memory.

4. The neural network device of claim 3, wherein, when the output feature map of the second layer, corresponding to the input feature map of the second layer, is output from the computational circuit as the output feature map of the first layer stored in the second memory address and reused as the input feature map of the second layer, the controller allocates a third memory address of the on-chip buffer memory for storing the output feature map of the second layer in the first direction from the start point.

5. The neural network device of claim 1, wherein the neural network operation includes a convolution operation, an activation operation, and a pooling operation, wherein the computational circuit is further configured to output, as the output feature map of the first layer, a result of performing the pooling operation and the convolution operation and the activation operation on the input feature map of the first layer.

6. The neural network device of claim 1, further comprising:

a weight buffer memory configured to store weight values of the first layer of the neural network operation on the input feature map of the first layer, wherein the weight buffer memory receives the weight values of the first layer from an external memory external to the neural network device through a single port of the weight buffer memory, and transmits the weight of the first layer to the computational circuit through a single port of the weight buffer memory.

7. The neural network device of claim 1, wherein the on-chip buffer memory, the computational circuit, and the controller are mounted in a single chip.

8. The neural network device of claim 1, further comprising:

an auxiliary buffer memory, wherein, when the output feature map of the second layer, corresponding to the input feature map of the second layer, is output from the computational circuit, the controller determines whether a total size of the input feature map of the second layer and the output feature map of the second layer exceeds a size of the on-chip buffer memory, and when the total size exceeds the size of the on-chip buffer memory, the controller temporarily stores the output feature map of the second layer in the auxiliary buffer memory instead of the on-chip buffer memory, and wherein the output feature map of the second layer temporarily stored in the auxiliary buffer memory is transmitted to an external memory outside the neural network device based on a preset period.

9. The neural network device of claim 8, wherein, when an output feature map of a third layer, corresponding to an input feature map of the third layer, is output from the computational circuit as the output feature map of the second layer and reused as an input feature map for a neural network operation of the third layer subsequent to the second layer, the controller determines whether a size of the output feature map of the third layer exceeds the size of the on-chip buffer memory, wherein, when the size of the output feature map of the third layer exceeds the size of the on-chip buffer memory, the controller temporarily stores the output feature map of the third layer in the auxiliary buffer memory, and wherein, when the size of the output feature map of the third layer is less than or equal to the size of the on-chip buffer memory, the controller stores the output feature map of the third layer in the on-chip buffer memory.

10. A processor-implemented method, the method comprising:

storing an input feature map of a first layer of a neural network in an on-chip buffer memory;

transmitting the input feature map of the first layer from a single port of the on-chip buffer memory to a computational circuit via a local bus connecting the computational circuit to the on-chip buffer memory;

outputting an output feature map of the first layer, corresponding to the input feature map of the first layer, upon the computational circuit performing a neural network operation on the input feature map of the first layer;

transmitting the output feature map of the first layer to the on-chip buffer memory via the local bus and through the single port, thereby storing the output feature map of the first layer and the input feature map of the first layer together in the on-chip buffer memory;

performing a read operation through the single port of reading data constituting, at least, a portion of the input feature map of the first layer from the on-chip buffer memory at each cycle in which each of one or more operation loops is executed, in order to perform the neural network operation based on the one or more operation loops; and when a write operation for writing data constituting, at least, a portion of the output feature map of the first layer to the on-chip buffer memory through the single port is requested at a timing at which the read operation is to be performed, performing the write operation in preference to the read operation, wherein the output feature map of the first layer is reused as an input feature map for a neural network operation of a second layer subsequent to the first layer, and wherein, when the read operation of the feature map and the write operation of the feature map are simultaneously requested, an order of the read operation and the write operation are adjusted on the local bus, to prevent a collision between the read operation and the write operation in the single port.

11. The method of claim 10, wherein the storing of the output feature map of the first layer and the input feature map of the first layer together in the on-chip buffer memory comprises:

allocating, in different memory address directions of the one memory address space, a first memory address of the on-chip buffer memory for storing the input feature map of the first layer and a second memory address of the on-chip buffer memory for storing the output feature map of the first layer concurrent with the storing of the input feature map at the first memory address.

12. The method of claim 11, wherein the allocating comprises:

allocating the first memory address for storing the input feature map of the first layer, in a first direction from a start point of a memory address corresponding to a storage space of the on-chip buffer memory; and allocating the second memory address for storing the output feature map of the first layer, in a second direction opposite to the first direction from a last point of the memory address corresponding to the storage space of the on-chip buffer memory.

13. The method of claim 12, further comprising:

when the output feature map of the second layer, corresponding to the input feature map of the second layer, is output from the computational circuit as the output feature map of the first layer stored in the second memory address and reused as the input feature map of the second layer, allocating a third memory address of the on-chip buffer memory for storing the output feature map of the second layer in the first direction from the start point.

14. The method of claim 10, wherein the neural network operation includes a convolution operation, an activation operation, and a pooling operation, and wherein the outputting comprises:

outputting, as the output feature map of the first layer, a result of performing the pooling operation as well as the convolution operation and the activation operation on the input feature map of the first layer.

15. The method of claim 10, further comprising:

when weight values of the first layer are transmitted from an external memory external to a neural network device to a weight buffer memory through a single port of the weight buffer memory, storing in the weight buffer memory the weight values of the first layer used for the neural network operation; and transmitting the weight values of the first layer from the weight buffer memory to the computational circuit through the single port of the weight buffer memory.

16. The method of claim 10, further comprising:

when the output feature map of the second layer, corresponding to the input feature map of the second layer, is output from the computational circuit, determining whether a total size of the input feature map of the second layer and the output feature map of the second layer exceeds a size of the on-chip buffer memory; and when it is determined that the total size exceeds the size of the on-chip buffer memory, temporarily storing the output feature map of the second layer in an auxiliary buffer memory instead of the on-chip buffer memory, wherein the output feature map of the second layer temporarily stored in the auxiliary buffer memory is transmitted to an external memory outside the neural network device based on a preset period.

17. The method of claim 16, further comprising:

when an output feature map of a third layer, corresponding to an input feature map of the third layer, is output from the computational circuit as the output feature map of the second layer and reused as an input feature map for a neural network operation of the third layer subsequent to the second layer, determining whether a size of the output feature map of the third layer exceeds the size of the on-chip buffer memory; and when the size of the output feature map of the third layer exceeds the size of the on-chip buffer memory, temporarily storing the output feature map of the third layer in the auxiliary buffer memory, and when the size of the output feature map of the third layer is less than or equal to the size of the on-chip buffer memory, storing the output feature map of the third layer in the on-chip buffer memory.

18. A non-transitory computer readable recording medium storing instructions that, when executed by a processor, causes the processor to control perform a method, the method comprising:

storing an input feature map of a first layer of a neural network in an on-chip buffer memory;

transmitting the input feature map of the first layer from a single port of the on-chip buffer memory to a computational circuit via a local bus connecting a computational circuit to the on-chip buffer memory;

outputting an output feature map of the first layer, corresponding to the input feature map of the first layer, upon the computational circuit performing a neural network operation on the input feature map of the first layer;
transmitting the output feature map of the first layer to the on-chip buffer memory via the local bus and through the single port, thereby storing the output feature map of the first layer and the input feature map of the first layer together in the on-chip buffer memory;
performing a read operation through the single port of reading data constituting, at least, a portion of the input feature map of the first layer from the on-chip buffer memory at each cycle in which each of one or more operation loops is executed, in order to perform the neural network operation based on the one or more operation loops; and
when a write operation for writing data constituting, at least, a portion of the output feature map of the first layer to the on-chip buffer memory through the single port is requested at a timing at which the read operation is to be performed, performing the write operation in preference to the read operation,
wherein the output feature map of the first layer is reused as an input feature map for a neural network operation of a second layer subsequent to the first layer, and
wherein, when the read operation of the feature map and the write operation of the feature map are simultaneously requested, an order of the read operation and the write operation are adjusted on the local bus, to prevent a collision between the read operation and the write operation in the single port.

* * * * *